(12) United States Patent
Gasser (10) Patent No.: US 11,817,763 B2
(45) Date of Patent: Nov. 14, 2023

(54) RESILIENT MOUNT ASSEMBLIES FOR ELECTRIC MACHINE ASSEMBLIES

(71) Applicant: Regal Beloit America, Inc., Beloit, WI (US)

(72) Inventor: Patrick Gasser, Washington, WI (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 17/706,787

(22) Filed: Mar. 29, 2022

(65) Prior Publication Data

US 2023/0318398 A1    Oct. 5, 2023

(51) Int. Cl.
*H02K 5/24* (2006.01)
*F16B 43/00* (2006.01)
*F16M 5/00* (2006.01)
*H02K 5/22* (2006.01)

(52) U.S. Cl.
CPC .............. *H02K 5/24* (2013.01); *F16B 43/00* (2013.01); *F16M 5/00* (2013.01); *H02K 5/225* (2013.01)

(58) Field of Classification Search
CPC .......... H02K 5/24; H02K 5/225; F16B 43/00; F16M 5/00
See application file for complete search history.

(56) References Cited

U.S. PATENT DOCUMENTS

| | | | | |
|---|---|---|---|---|
| 1,781,161 A | * | 11/1930 | Carrey | F16F 3/10 248/596 |
| 2,064,751 A | * | 12/1936 | Hussman | F16F 15/06 248/626 |
| 2,141,648 A | * | 12/1938 | Geyer | H02K 5/24 248/605 |
| 2,454,538 A | * | 11/1948 | Bazley | F16F 15/073 248/626 |
| 2,756,953 A | * | 7/1956 | Button | H02K 5/00 235/145 R |
| 3,983,429 A | * | 9/1976 | Allardice, Jr. | H02K 5/24 310/91 |
| 4,988,069 A | | 1/1991 | D'Silva | |
| 6,011,336 A | * | 1/2000 | Mathis | F16F 1/376 4/584 |
| 6,098,949 A | * | 8/2000 | Robinson | F16F 1/3732 248/609 |
| 6,378,832 B1 | * | 4/2002 | Li | F16F 1/3849 267/141.5 |
| 7,191,998 B1 | * | 3/2007 | Chalberg | F16M 7/00 248/676 |

(Continued)

FOREIGN PATENT DOCUMENTS

CN      209267313 U    8/2019
CN      209513269 U    10/2019

(Continued)

*Primary Examiner* — Anita M King (74) *Attorney, Agent, or Firm* — Armstrong Teasdale LLP (57) ABSTRACT

A mount assembly for supporting an electric machine assembly is provided. The electric machine assembly includes a base and at least one elastic component disposed between the base and the electric machine assembly. The at least one elastic component dampens vibrations generated by the electric machine assembly. The electric machine assembly may be selectively arranged in at least one of a first orientation, a second orientation, and a third orientation relative to the base.

19 Claims, 11 Drawing Sheets

(56) References Cited

U.S. PATENT DOCUMENTS

| | | | |
|---|---|---|---|
| 9,559,561 B2 | 1/2017 | Collins et al. | |
| 9,705,377 B2 | 7/2017 | Nicoloff | |
| 10,742,089 B2 * | 8/2020 | Schmidt | H02K 5/26 |
| 10,797,559 B2 * | 10/2020 | Thawani | F16F 15/08 |

FOREIGN PATENT DOCUMENTS

| | | |
|---|---|---|
| CN | 210806909 U | 6/2020 |
| CN | 211183670 U | 8/2020 |
| CN | 111764136 A | 10/2020 |

* cited by examiner

RESILIENT MOUNT ASSEMBLIES FOR ELECTRIC MACHINE ASSEMBLIES

BACKGROUND

The field of the invention relates generally to mount assemblies for electrical machines and, more particularly, to reconfigurable mount assemblies for electric motors with vibration control.

BRIEF DESCRIPTION

Electric motors are commonly used to drive mechanical devices, such as pumps, conveyors, tools, fans, and the like. Electric motors transmit mechanical power to mechanical devices through a rotating driveshaft. Proper positioning and alignment of the driveshaft is critical in ensuring power is transmitted properly and efficiently. Even minor misalignment between the electric motor and the mechanical device creates variations in power transmission resulting in mechanical wear. Electric motors may be situated in confined spaces with limited clearance between the electric motor and one or more surrounding machinery. Conventional electric motors include a conduit box that extends radially outward from a motor housing. In some situations, it may be necessary to orientate the electric motor so that there is sufficient space for the conduit box.

For these reasons, adjustable mounting frames are advantageous for mounting and alignment of electric motors. However, at least some known adjustable motor mounting frames are limited in the range of available orientations that the electric motor may be positioned relative to the mount. In some known mounts, the orientation of the electric motor cannot be changed, e.g., the electric motor may only be able to translate relative to the mount. Furthermore, at least some known adjustable mounting frames reorientation requires disassembly and reassembly of multiple components making changes in electric motor orientation a very time consuming and tedious process.

Operation of electric motors produces vibrations, in both a radial and axial directions. Motor vibrations are transmitted through the mounting frame to other connecting structures, leading to loosening of fasteners or connectors used with the connecting structures. Additionally, vibrations have other unwanted effects, such as noise. Various conventional solutions have been proposed to reduce motor vibrations, including shock mounts, designed to absorb and dampen vibrations. Limited solutions are available for adjustable mounting frames that also control vibrations in multiple directions.

Accordingly, there is a need for a vibration control motor mount with adjustable positioning that overcomes the drawbacks described above.

DETAILED DESCRIPTION

Embodiments of a mount assembly described herein support an electric machine assembly in one of a plurality of orientations. More specifically, an operator may select an orientation of the electric machine assembly such that a terminal box is positioned in an area with sufficient clearance. Reorientation of the electric machine assembly relative to the mount assembly may be performed in one or more simple steps requiring two or fewer tools and/or one tool. Additionally, embodiments of the mount assembly described herein may support a variety of types and sizes of electric motor assemblies. At least some embodiments described herein the mount assembly is only connected to one of a first endbell or a second endbell such that the mount assembly may support electric motor assemblies with various lengths. The mount assembly includes one or more elastic components which reduce transmission of vibrations produced by the electric machine assembly in both an axial and radial direction.

Figure 1:
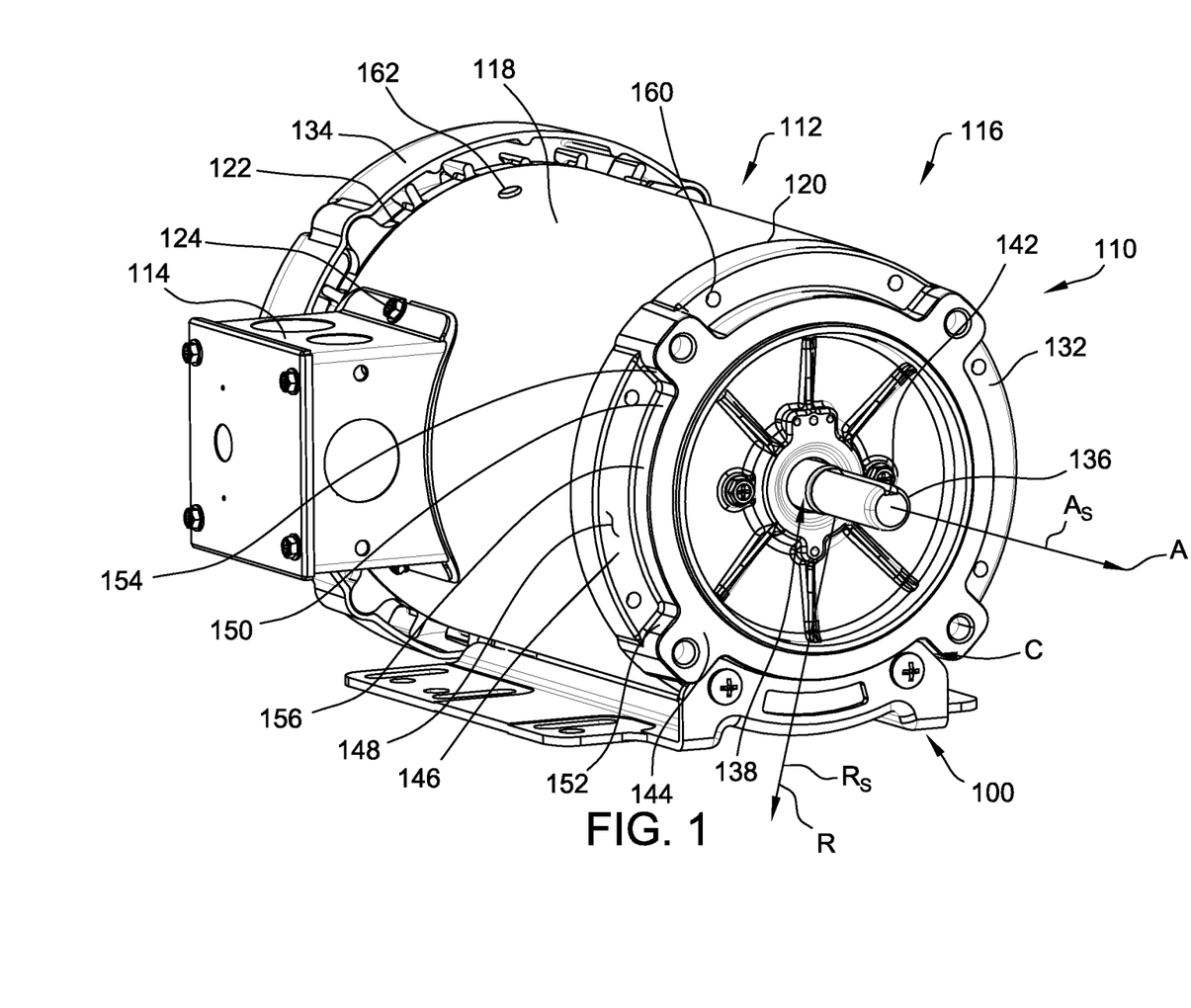
FIG. 1 is a perspective view of an exemplary embodiment of a mount assembly supporting an exemplary embodiment of an electric machine assembly.
Figure 2:
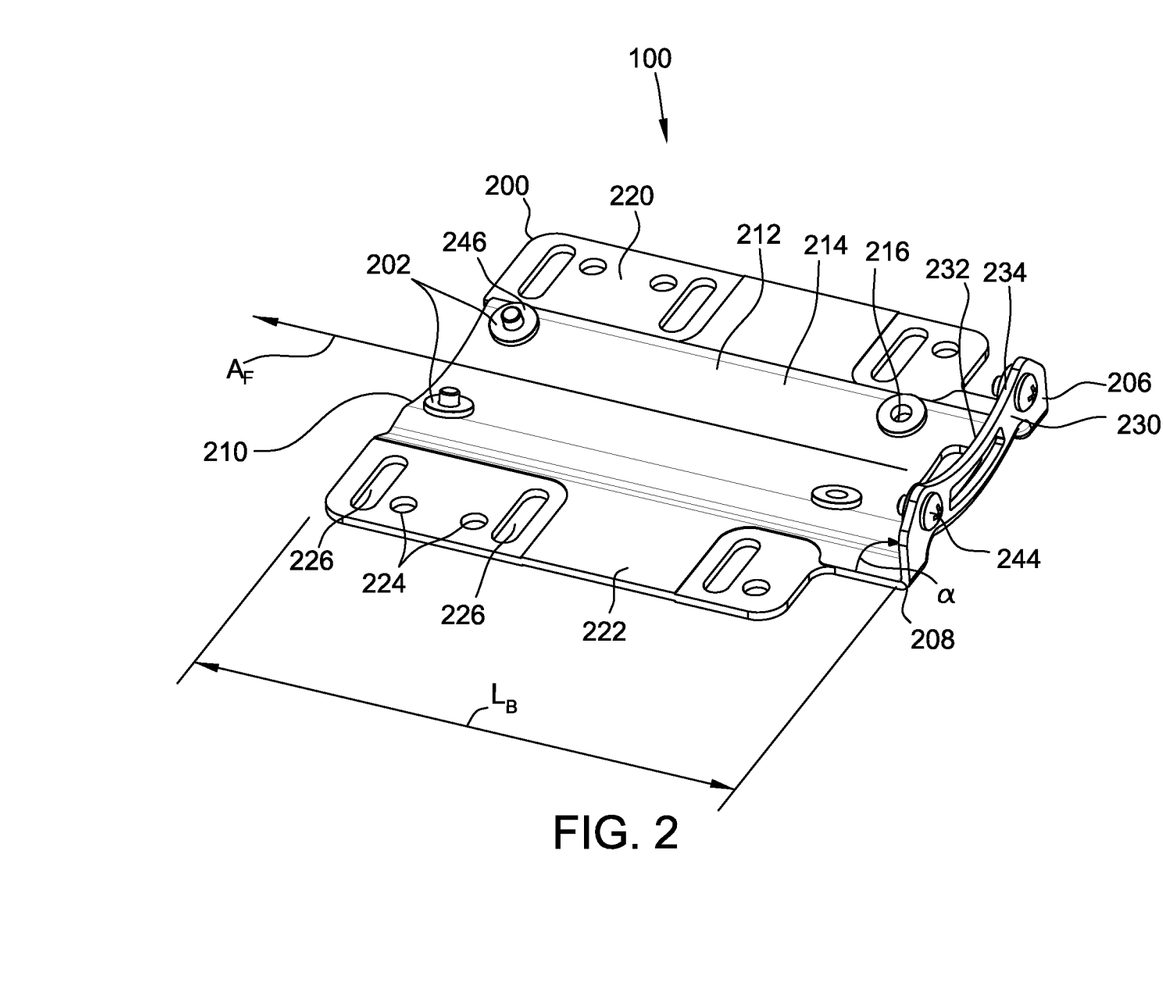
FIG. 2 is a perspective view of the mount assembly shown in FIG. 1.
Figure 3:
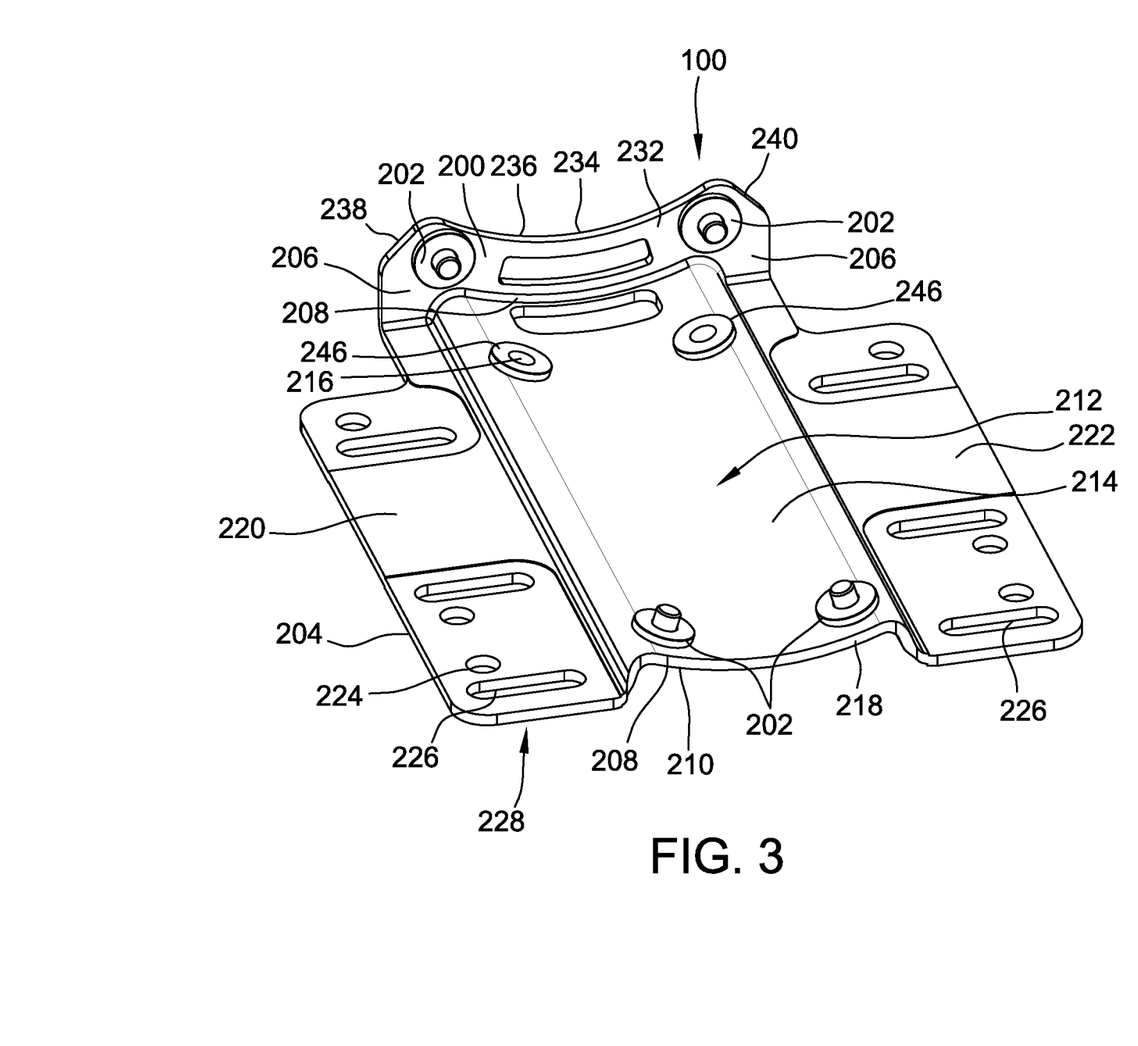
FIG. 3 is a rear perspective view of the mount assembly shown in FIG. 2
Figure 4:
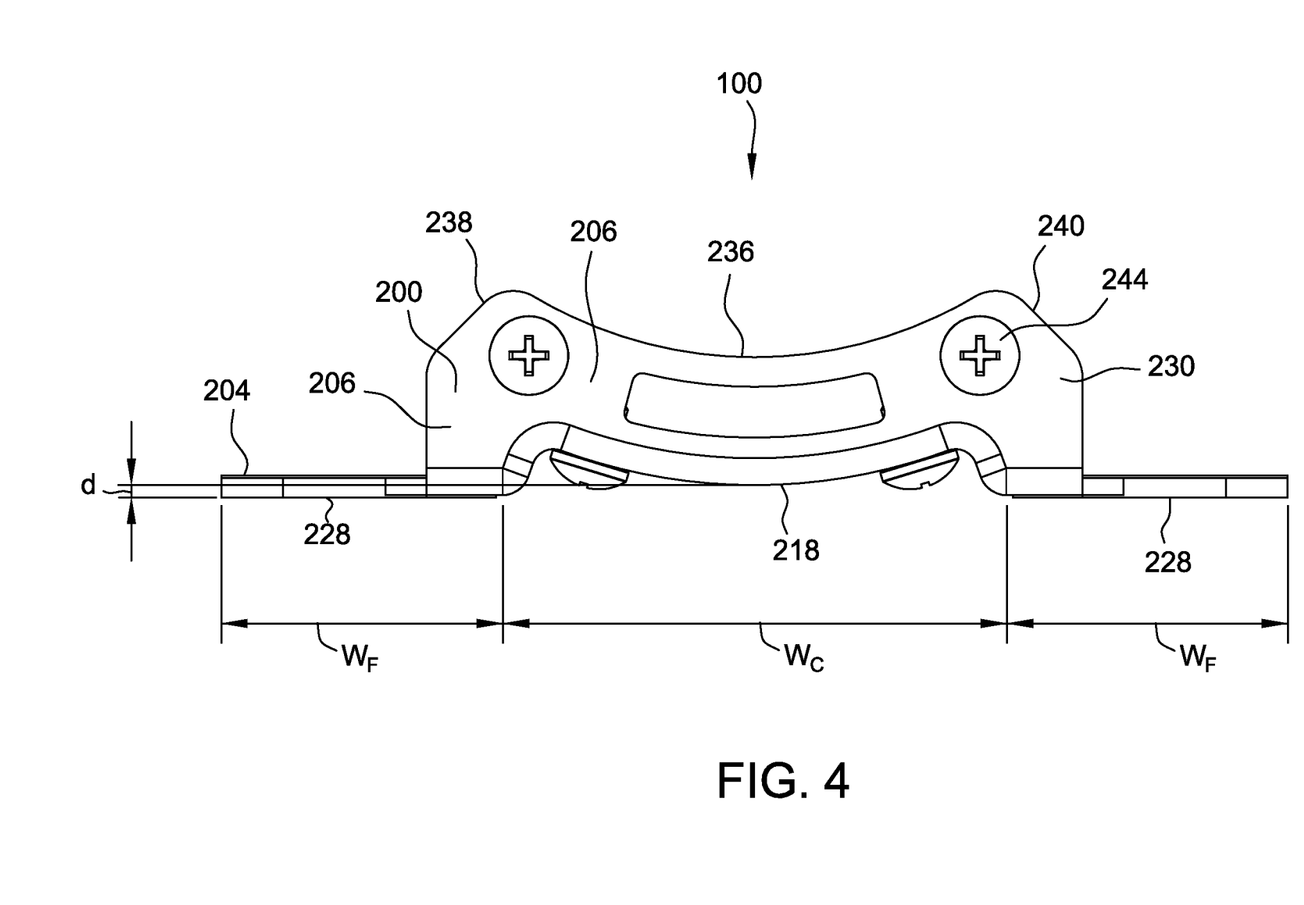
FIG. 4 is a front view of the mount assembly shown in FIG. 2.

FIG. 1 is a perspective view of an exemplary mount assembly 100 supporting an exemplary electric machine assembly 110. The electric machine assembly 110 may be selectively connectable to the mount assembly 100 in one of a plurality of electric machine assembly 110 orientations. The electric machine assembly 110 includes a motor assembly 112 and a terminal box 114. The plurality of available orientations of the electric machine assembly 110 relative to the mount assembly 100 may be used to select the position of the terminal box 114 relative to the mount assembly 100, as will be described in further detail herein.

The motor assembly 112 includes a housing 116 including a shell 118. The shell 118 is generally cylindrical in shape and extends along a shell axis $A_s$ from a first end 120 to a second end 122. The housing 116 further includes a front endbell 132 disposed at the first end 120 of the shell 118 and a rear endbell 134 disposed at the second end 122 of the shell 118. The shell axis $A_s$ extends generally through a geometric center of the shell 118. The shell further includes a radial axis $R_s$ extending radially outward from the shell axis $A_s$. The housing 116 includes an axial direction A defined parallel to the shell axis $A_s$ and a radial direction R defined perpendicular to the shell axis $A_s$. The terminal box 114 is connected to the shell 118 and extends outward therefrom in the radial direction R. The terminal box 114 is rigidly fixed to the shell 118 using one or more fasteners 124, e.g., bolts or screws and/or welding. The front endbell 132 and the rear endbell 134 may be connected to the shell 118 using suitable fasteners 124 and/or welding.

The motor assembly 112 further includes a driveshaft 136. At least a portion of the driveshaft 136 extends outside the housing 116. In particular, at least a portion of the driveshaft 136 extends through an aperture 138 formed on the front endbell 132. The motor assembly 112 includes a bearing 140 coupled to the front endbell 132 and disposed within the aperture 138. The bearing 140 supports rotations of the driveshaft 136. In the exemplary embodiment, the driveshaft 136 extends generally along the shell axis $A_s$. The driveshaft 136 includes a keyed portion 142 enabling the driveshaft 136 to be connected to a mechanical device, e.g., a pump.

The electric machine assembly 110 includes one or more components associated with a conventional electric motor that are not shown. The one or more components of the electric machine assembly 110 may include a power source, a rotor, windings, commutators, bearings, etc. and any additional components that enable the electric machine assembly 110 to rotate the driveshaft 136. The one or more components may be stored within the housing 116. The exemplary electrical machine assembly 110, shown in FIG. 1, is an example electric machine assembly and the mount assembly 100 may be used with any suitable electric machine assembly. For example, the electric machine assembly 110 may be a DC type electric motor or an AC type electric motor. In other embodiments, the shell 118 may be other shapes or sizes, e.g., the shell 118 may be rectangular in shape. The electric machine assembly 110, shown in FIG. 1, is an example and does not limit the use of the mount assembly 100. The mount assembly 100 may be used to support and dampen vibrations of one or more different types, e.g., sizes and shapes, of electric motor assemblies that are not shown.

In further reference to FIG. 1, the front endbell 132 includes a front surface 144 and an arched surface 146 that is recessed from the front surface 144. As used herein, the term "arched" is intended to describe an arcuate or curved shape that follows at least a portion of a circle or ellipse. The arched surface 146 at least partially defines an arched channel 148. The arched channel 148 is further defined, in part, by a channel wall 150. In the exemplary embodiment, the channel wall 150 includes a first channel wall 152, a second channel wall 154, and a third channel wall 156. The third channel wall 156 extends between the first and second channel walls 152 and 154. The third channel wall 156 may be arched. In the exemplary embodiment, the front endbell 132 includes at least four of the arched channels 148 arranged in a radially symmetric pattern about the shell axis $A_s$. In other embodiments, the front endbell 132 may have any suitable number of arched channels 148. For example, the front endbell 132 may have 2, 3, 4, 5 and/or 6 arched channels 148 arranged in a radially symmetric pattern about the shell axis $A_s$.

The rear endbell 134 includes a rear surface 158. In alternative embodiments, the rear surface 158 may have features similar to the front surface 144. For example, in some embodiments, the rear surface 158 may include the arched channels 148.

The front endbell 132 includes one or more openings 160 defined through each of the arched surfaces 146. In the exemplary embodiment, the one or more openings 160 may be blind bore holes that extend for a depth, not shown, that is only a portion of a thickness of the front endbell 132. In the exemplary embodiment, the front endbell 132 includes a pair of openings 160 defined through each of the arched surfaces 146. In other embodiments, the front endbell 132 includes any suitable number of openings 160 defined through the arched surfaces 146.

The shell 118 defines a plurality of shell openings 162 sized and shaped to receive a screw and/or bolt. The shell openings 162 may be through holes, extending all the way through a thickness of the shell 118. In other embodiments, the shell openings 162 may be blind holes and do not extend all the way through a thickness of the shell 118. The shell openings 162 may or may not have a bolt or screw disposed within the shell opening 162. Alternatively, a plug, e.g., a rubber stopper, may be disposed within the shell opening 162. Accordingly, at least one of a screw and/or the plug may be disposed within the shell openings 162 such that materials and/or debris external to the housing 116 cannot pass through the shell openings 162 into the housing 116.

In reference to FIGS. 2-5, the mount assembly 100 includes a base 200 and one or more elastic components 202. The base 200 includes a first portion 204 and a second portion 206. The second portion 206 is arranged generally perpendicularly to the first portion 204. For example, the second portion 206 is positioned relative to the first portion 204 such that an angle α arranged between the first portion 204 and the second portion 206 is 90°±10°, see FIG. 2. When the mount assembly 100 supports the electric machine assembly 110, the first portion 204 extends generally parallel to the shell axis $A_s$ and the second portion 206 extends generally perpendicular to the shell axis $A_s$. In some embodiments, the first portion 204 and the second portion 206 may be formed from a single piece of material. For example, the base 200 may be shaped using pressing and shaping tools to form the first portion 204 and the second portion 206. Alternatively, the first portion 204 and the second portion 206 may be formed using a casting process. Alternatively, the first portion 204 and the second portion 206 may be formed separately and coupled together using suitable fasteners and/or welding.

The first portion 204 includes a first end 208 and an opposing second end 210 and a first axis $A_F$ extending therebetween. The first portion 204 includes a length $L_B$ extending between the first end 208 and the second end 210. When the mount assembly 100 is connected to the electric machine assembly 110, the first portion 204 is arranged such that the first axis $A_F$ extends generally parallel to the shell axis $A_s$ and/or generally parallel to the driveshaft 136. The first portion 204 is generally symmetric about the first axis $A_F$. The first portion 204 includes a central portion 212 having a first surface 214. In the exemplary embodiment, the first surface 214 is complementary in shape to the shape of the shell 118. In particular, the first surface 214 is saddle-like having a concavity defined by a curvature that generally matches a curvature of the shell 118 that is cylindrical in shape. In alternative embodiments, the first surface 214 is concave with a curvature that is greater than a curvature of the shell 118 that is cylindrical. The central portion 212 includes a second surface 218 opposing the first surface 214. In the exemplary embodiment, the second surface 218 is convex, see FIG. 4, for example.

In alternative embodiments, the central portion is generally planar, e.g., the first surface 214 and the opposing second surface 218 are both planar. The central portion 212, the first surface 214, and the second surface 218 are any shape and/or size that enables the mount assembly 100 to function as described herein.

The central portion 212 includes one or more of the first portion openings 216 extending through the central portion 212. In embodiments where the first surface 214 is concave, the first portion openings 216 may extend in a radial direction R relative to a curvature of the first surface 214. In embodiments where the central portion 212 is generally planar, the first portion openings 216 extend through the central portion 212 generally perpendicular to the planar central portion 212.

The first portion 204 includes a first flange 220 and a second flange 222 disposed on opposing sides of the central portion 212. The first flange 220 and second flange 222 enable the mount assembly 100 to be attached to one or more mounting structures, not shown. The first and second flanges 220 and 222 may be used to fixedly secure the mount assembly 100 to suitable mounting structures, using one or more suitable fasteners. The first flange 220 and the second flange 222 define at least one of one or more flange openings 224 and one or more flange slots 226. In the exemplary embodiment, the first and second flanges 220 and 222 define a plurality of the flange openings 224 and a plurality of the flange slots 226. The flange openings 224 and the flange slots 226 are sized and shaped such that a screw or bolt, not shown, may be passed through, to secure the first flange 220 and the second flange 222 to a mounting structure.

The first and second flanges 220 and 222 are arranged relative to the central portion 212, such that the central portion 212 is spaced apart from the mounting structure. In particular, the first and second flanges 220 and 222 include a lower surface 228. When the mount assembly 100 is connected to a mounting structure, the lower surface 228 may be in contact with, or in close proximity to the mounting structure. The lower surface 228 is spaced a distance from the second surface 218, see FIG. 4. The distance d may be between 5-10 mm. Accordingly, when the mount assembly 100 is connected to a mounting structure, the second surface is spaced at least a distance d away from the mounting structure.

The first and second flanges 220 and 222 include a width $W_F$ and the central portion 212 includes a width $W_c$. In the exemplary embodiment, the width $W_F$ and width $W_c$ may be approximately the same. In some embodiments, the width $W_F$ may be longer than and width $W_c$. The width $W_F$ and width $W_c$ may be sized to provide a stabilized support for the electric machine assembly 110.

At least a portion of the second portion 206 is sized and shaped to be received within at least one of the arched channels 148 defined on the front endbell 132. See FIG. 1. The second portion 206 includes an outer surface 230 and an inner surface 232 and a side surface 234 that extends between the outer surface 230 and inner surface 232. The side surface 234 includes an arched surface 236 that is shaped complementary to the third channel wall 156. The side surface 234 further includes a first angled surface 238 and second angled surface 240, disposed on opposing sides of the arched surface 236. The first and second angled surfaces 238 and 240 are shaped complementary to the first and second channel walls 152 and 154. The second portion 206 defines one or more second portion openings 242, which extend through the second portion 206.

When the mount assembly 100 supports the electric machine assembly 110, and at least a portion of the second portion 206 is disposed within the arched channel 148, the arched surface 236 is arranged in close proximity to, and/or in contact with, the third channel wall 156. The arched surface 236 may be spaced a clearance C from the third channel wall 156. In addition, the first and second angled surfaces 238 and 240 may be in close proximity to, and/or in contact with the respective first and second channel walls 152 and 154. The first and second angled surfaces 238 and 240 may be spaced from the first and second channel surfaces by a clearance C. The clearance C may be between 1-5 mm. Accordingly, at least a portion of the second portion 206 fits within the arched channel 148 with minimal clearance C. The minimal clearance C facilitates alignment between the electric machine assembly 110 and the mount assembly 100. In other words, the electric machine assembly 110 and the mount assembly 100 may not be mated together unless there is proper alignment between the second portion 206 and the arched channel 148.

When the mount assembly 100 is connected to the electric machine assembly 110, the second portion 206 is disposed at least partially within the arched channel 148 and the second portion openings 242 are aligned with the openings 160 defined on the front endbell 132. In addition, when the mount assembly 100 is connected to the electric machine assembly 110 at least a portion of the shell 118 is received within the curvature of the first surface 214 and the first portion openings 216 defined in the first portion 204 are aligned with the shell openings 162. Fasteners 244 may be passed through the first portion openings 216 and into the shell openings 162 to secure the first portion 204 to the shell 118. Likewise, the fasteners 244 may be passed through the second portion openings 242 and into the openings 160 to secure the second portion 206 to the front endbell 132.

In the exemplary embodiment, the side surface 234 is shaped such that the sides surface 234 mirrors the profile of the channel wall 150. In particular, the side surface 234 is shaped to mirror the first channel wall 152, the second channel wall 154, and the third channel wall 156 extending between the first and second channel walls 152 and 154. Accordingly, in alternative embodiments, the side surface 234 may be shaped and sized to mirror a relationship with an endbell of any suitable electric machine assembly.

Figure 5:
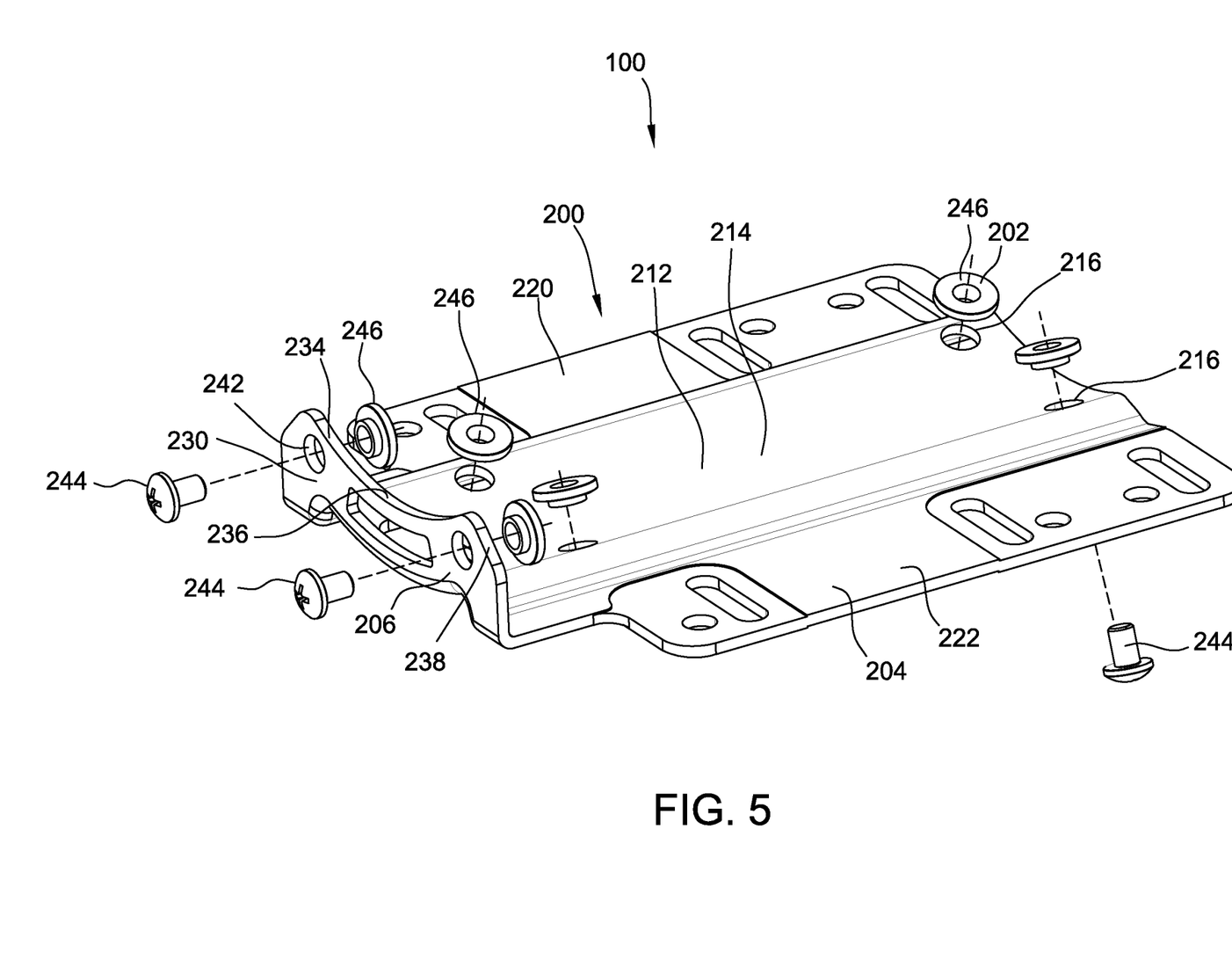
FIG. 5 is an assembly view of the mount assembly shown in FIG. 2.

FIG. 5 is an exploded view of the mount assembly 100. The elastic components 202 are composed of an elastic material that deforms under a force. Deformation of the elastic components 202 absorbs and/or dampens vibrations and shock produced by the electric machine assembly 110. The elastic components 202 may be disposed between the electric machine assembly 110 and the base 200, e.g., the elastic component 202 is engaged with both the electric machine assembly 110 and the base 200. Accordingly, the elastic components 202 act to dampen vibrations and shock produced by the electric machine assembly 110, such that the vibrations and shocks are not transmitted from the electric machine assembly 110 to the base 200. The elastic components 202 may be composed of any suitable material having suitable material properties. For example, the elastic components 202 may be made from a rubber material, plastic, and the like.

Figure 6:
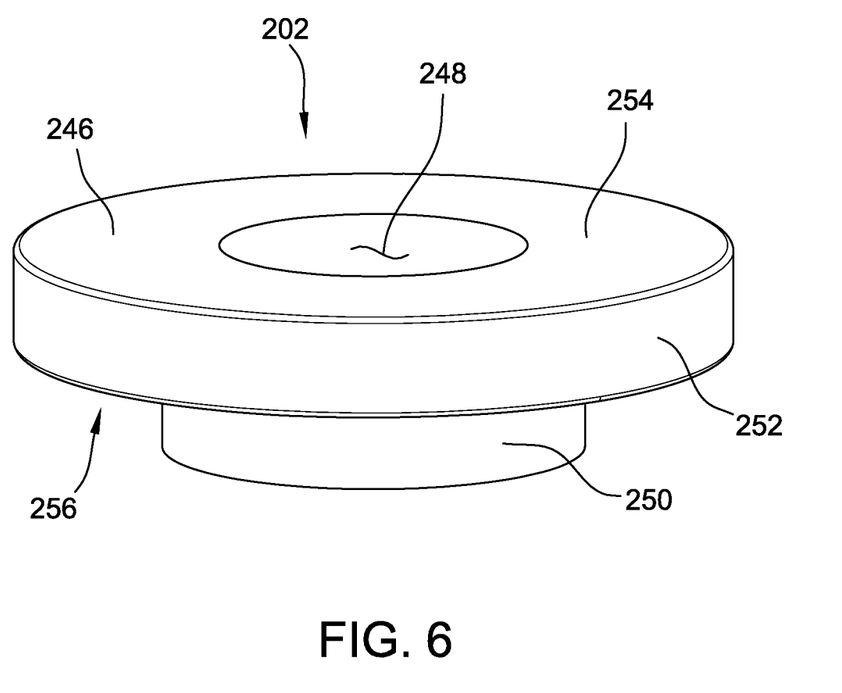
FIG. 6 is a perspective view of an exemplary elastic component for use with the mount assembly shown in FIG. 2.

In the exemplary embodiment, the one or more elastic components 202 are elastic washers 246. FIG. 6 shows a detailed view of the elastic component 202. The elastic washers 246 reduce the transmission of vibration and shock from the electric machine assembly 110 to the base 200. The elastic washers 246 define a passageway 248 that extends through the elastic washer 246. The elastic washer 246 includes a stem 250 and a head 252. The head 252 includes a first annular surface 254 and an opposing second annular surface 256. In the exemplary embodiment, the passageway 248 extends through the stem 250 and the head 252. The passageway 248 is sized and shaped such that a screw or bolt may be passed through the passageway 248 of the elastic washer 246.

When the mount assembly 100 supports the electric machine assembly 110 one or more elastic washers 246 may be disposed between the first portion 204 and the shell 118. For example, the stem 250 is sized and shaped to be received within one or more of the first portion openings 216 defined through the central portion 212. The stem 250 may fit snugly within the first portion opening 216 such that the elastic washer 246 is secured to the first portion 204. When the stem 250 of the elastic washer 246 is disposed within the first portion opening 216, the second annular surface 256 is in contact with the first surface 214 of the first portion 204 and the first annular surface 254 is in contact with the shell 118. The one or more elastic washers 246 disposed between the first portion 204 and the shell 118 reduce vibrations in the radial direction R. In other words, the elastic washers 246 disposed between the first portion 204 and the shell 118 reduce motion generated by the electric machine assembly 110 generally perpendicularly relative to the shell axis $A_s$.

When the mount assembly 100 supports the electric machine assembly 110 one or more elastic washers 246 may be disposed between the second portion 206 and the front endbell 132. For example, the stem 250 is sized and shaped to be received within one or more of the second portion openings 242 defined through the second portion 206. The stem 250 may fit snugly within the second portion opening 242 such that the elastic washer 246 is secured to the second portion 206. When the stem 250 of the elastic washer 246 is disposed within the second portion opening 242, the second annular surface 256 is in contact with the inner surface 232 of the second portion 206 and the first annular surface 254 is in contact with the arched surface 146. The one or more elastic washers 246 disposed between the second portion 206 and the front endbell 132 reduce vibrations along the axial direction A. In other words, the elastic washers 246 disposed between the second portion 206 and the front endbell 132 reduce motion generated by the electric machine assembly 110 generally parallel to the axial direction.

In the exemplary embodiment, the first portion 204 includes a plurality of first portion openings 216. The first portion openings 216 includes a first pair of openings and a second pair of openings. In the exemplary embodiment, each of the first portion openings 216 includes the elastic component 202, at least partially disposed therein. In the exemplary embodiment, the second portion 206 includes a pair of second portion openings 242. Each of the second portion openings 242 includes the elastic component 202 at least partially disposed therein. In alternative embodiments, the first portion 204 and the second portion 206 may include any suitable number of first portion openings 216 and second portion openings 242. Accordingly, the mount assembly 100 may include any suitable number of elastic components 202, enabling the mount assembly 100 to dampen vibrations generated by the electric machine assembly 110.

In alternative embodiments the elastic components 202 may be any shape, size, and or configuration that enables the mount assembly 100 to dampen vibrations produced by the electric machine assembly 110, when the mount assembly 100 is supporting the electric machine assembly 110. For example, in some embodiments, the elastic components 202 may not be an elastic washer 246. In some embodiments, the elastic component 202 may not include a stem 250 and/or a passageway 248. Accordingly, in some embodiments, the elastic components 202 may be separate from the first portion opening 216 and the second portion openings 242.

The electric machine assembly 110 is selectively connectable to the mount assembly 100 in one of a plurality of orientations of the electric machine assembly 110. As mentioned above, the electric machine assembly 110 includes the motor assembly 112 and the terminal box 114 that is fixedly coupled to the motor assembly 112. The terminal box 114 extends outwards from the motor assembly 112. In the illustrated embodiment, the electric machine assembly 110, shown in FIG. 1, the terminal box 114 extends outwards from the motor assembly 112 along the radial direction R. The plurality of available orientations of the electric machine assembly 110 relative to the mount assembly 100 allows a user to select a location of the terminal box 114 relative to the mount assembly 100. Accordingly, an operator may adjust the orientation of the electric machine assembly 110 to accommodate the spatial surroundings, e.g., available space and/or clearance for the electric machine assembly 110. For example, an operator may select an orientation of the electric machine assembly 110 such that the terminal box 114 is positioned in an area with sufficient clearance.

The mount assembly 100 may be attached, detached, and reattached, as necessary, to change the orientation the electric machine assembly 110 to reposition the terminal box 114. In the exemplary embodiment, the reorientation of the electric machine assembly 110 relative to the mount assembly 100 may be performed in one or more simple steps requiring two or fewer tools and/or one tool. For example, an operator may use a single tool to remove one or more fasteners 244 to disconnect the electric machine assembly 110 from the mount assembly 100. After the operator reorientates the electric machine assembly 110 relative to the mount assembly 100, the user may use the same tool to reattach the one or more fasteners 244 to connect the electric machine assembly 110 to the mount assembly 100.

In the exemplary embodiment, the user may only have to unscrew four screws to detach the electric machine assembly 110 from the mount assembly 100. Likewise, the user may only have to screw in four screws to attach the electric machine assembly 110 to the mount assembly 100. Furthermore, the electric machine assembly 110 may be detached/reattached to replace one or more of the elastic components 202. Additionally, the electric machine assembly 110 may be reoriented to change the position of the terminal box 114 without requiring disassembly of the electric machine assembly 110.

Figure 7:
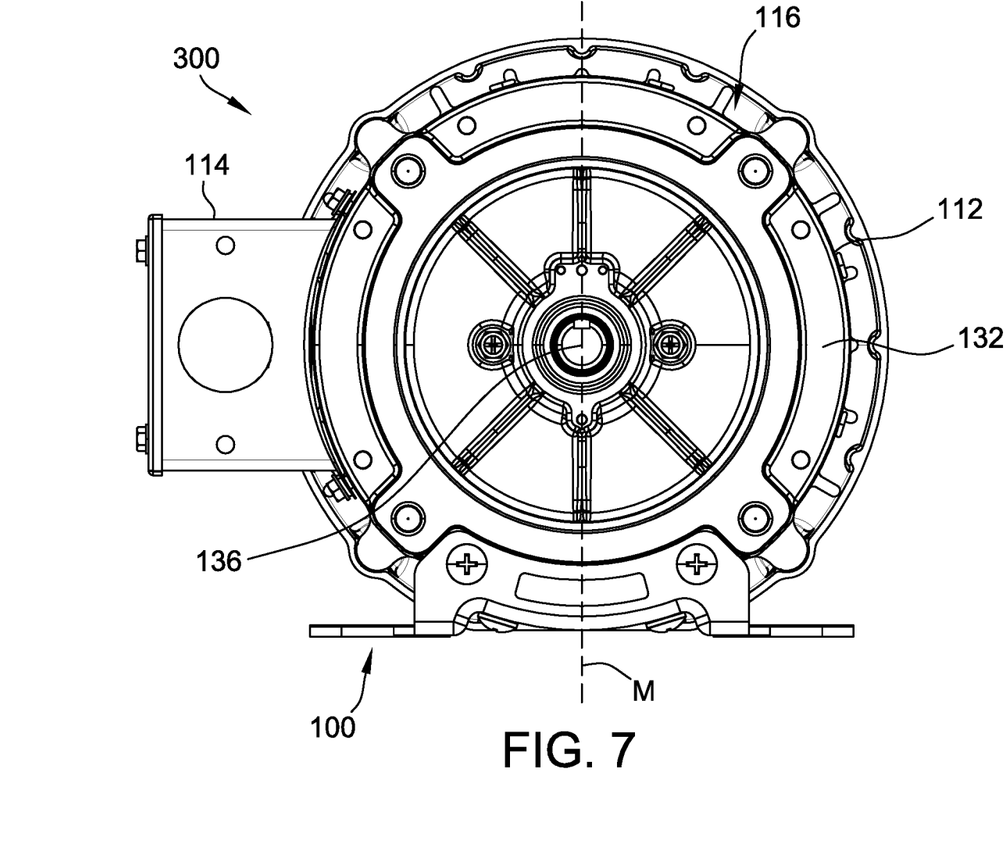
FIG. 7 is a front view of the mount assembly supporting the electric machine assembly showing the electric machine assembly arranged in a first orientation.
Figure 8:
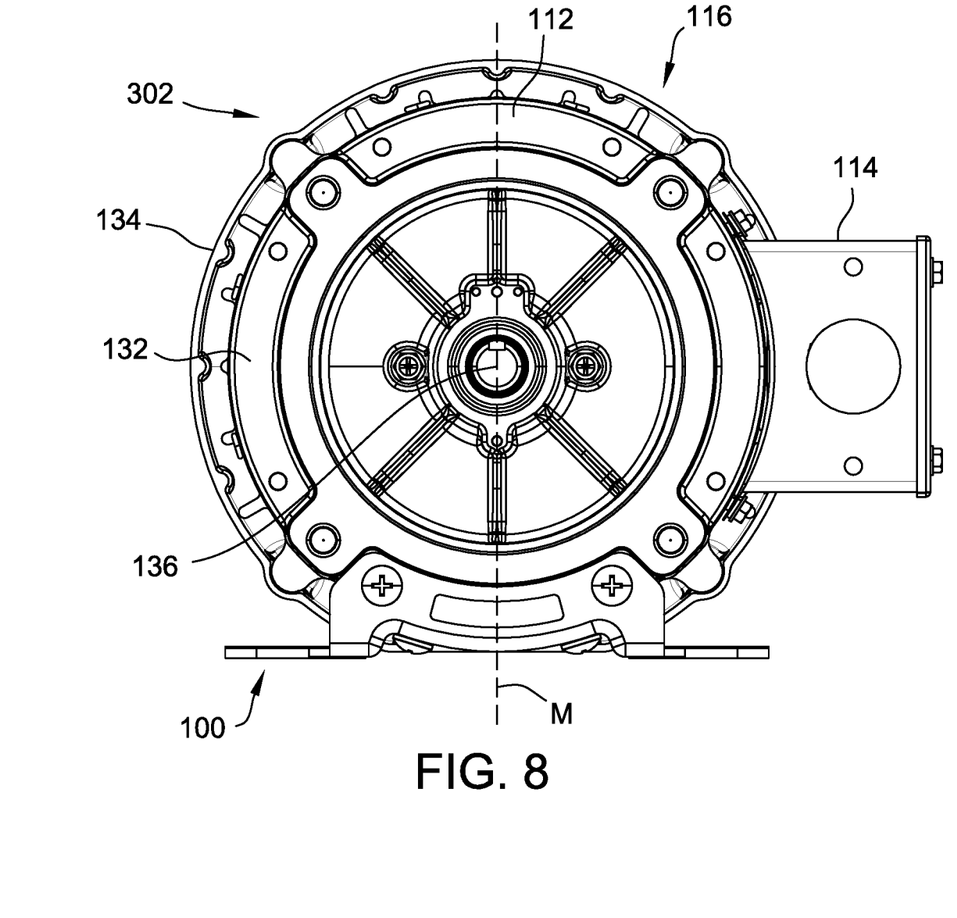
FIG. 8 is a front view of the mount assembly connected to the electric machine assembly showing the electric machine assembly arranged in a second orientation.
Figure 9:
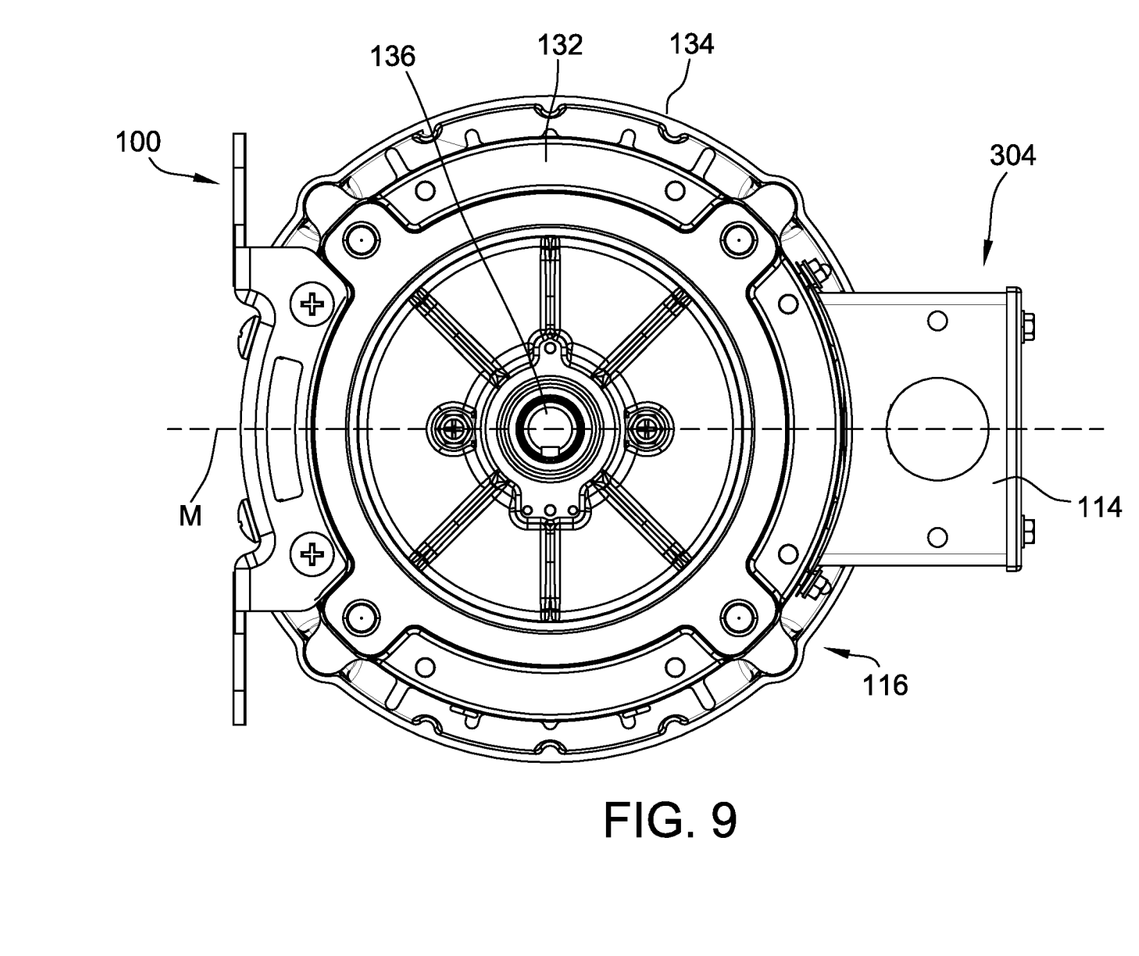
FIG. 9 is a front view of the electric machine assembly connected to the mount assembly showing the electric machine arranged in a third orientation.

In the exemplary embodiment, the electric machine assembly 110 may be connected to the mount assembly 100 when the electric machine assembly 110 is in a first orientation 300, see FIG. 7. In the first orientation 300, when viewing the electric machine assembly 110 from the front, the terminal box 114 is arranged in the 9 o'clock position. Additionally, and/or alternatively, in the first orientation 300, when viewing the electric machine assembly 110 from the front, the terminal box 114 is arranged on the left-hand side of a midline M of the motor assembly 112. The electric machine assembly 110 may be connected to the mount assembly 100 in a second orientation 302, see FIG. 8. In the second orientation 302, when viewing the electric machine assembly 110 from the front, the terminal box 114 is arranged in a 3 o'clock position. Additionally, and/or alternatively, in the second orientation 302, when viewing the electric machine assembly 110 from the front, the terminal box 114 is arranged on the right-hand side of a midline M of the motor assembly 112. The electric machine assembly 110 may be connected to the mount assembly 100 in a third orientation 304, see FIG. 9. In the third orientation 304, when viewing the electric machine assembly 110 from the front, the terminal box 114 is arranged in a 12 o'clock position. Additionally, and/or alternatively, in the third orientation 304, when viewing the electric machine assembly 110 from the front, the terminal box 114 is arranged generally along the midline M of the motor assembly 112.

The number and position of the arched channels 148 for receiving the second portion 206 therein, contributes to the available orientations of the electric machine assembly 110. For example, the four arched channels 148 illustrated in FIG. 1, allows the electric machine assembly 110 to be arranged in three different orientations: the first orientation 300, the second orientation 302, and the third orientation 304. Additional and/or alternative orientations of the electric machine assembly 110 may be available if the electric machine assembly 110 includes additional and/or alternatively positioned arched channels 148.

Figure 10:
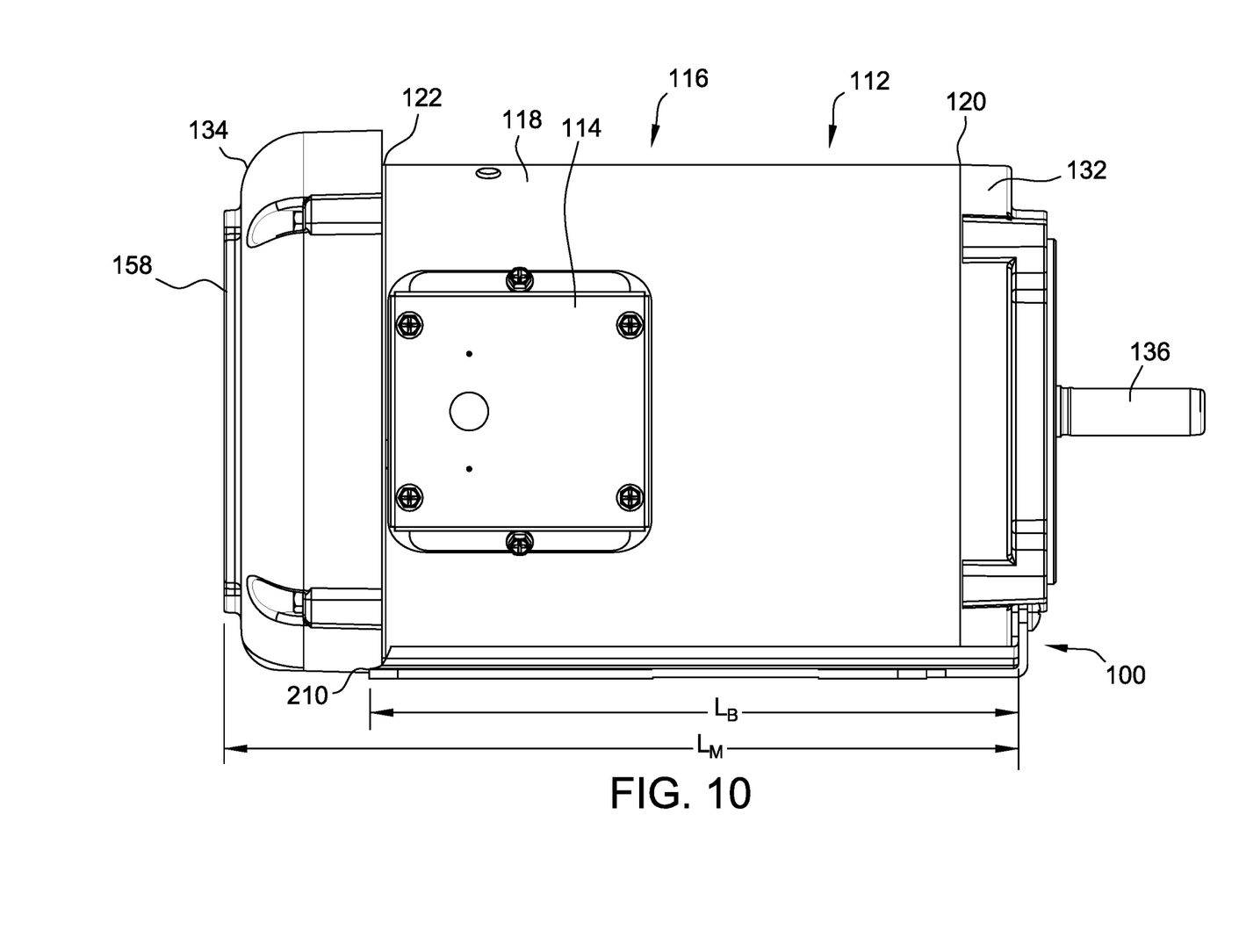
FIG. 10 is a side view of the mount assembly supporting the electric machine assembly shown in FIG. 1.
Figure 11:
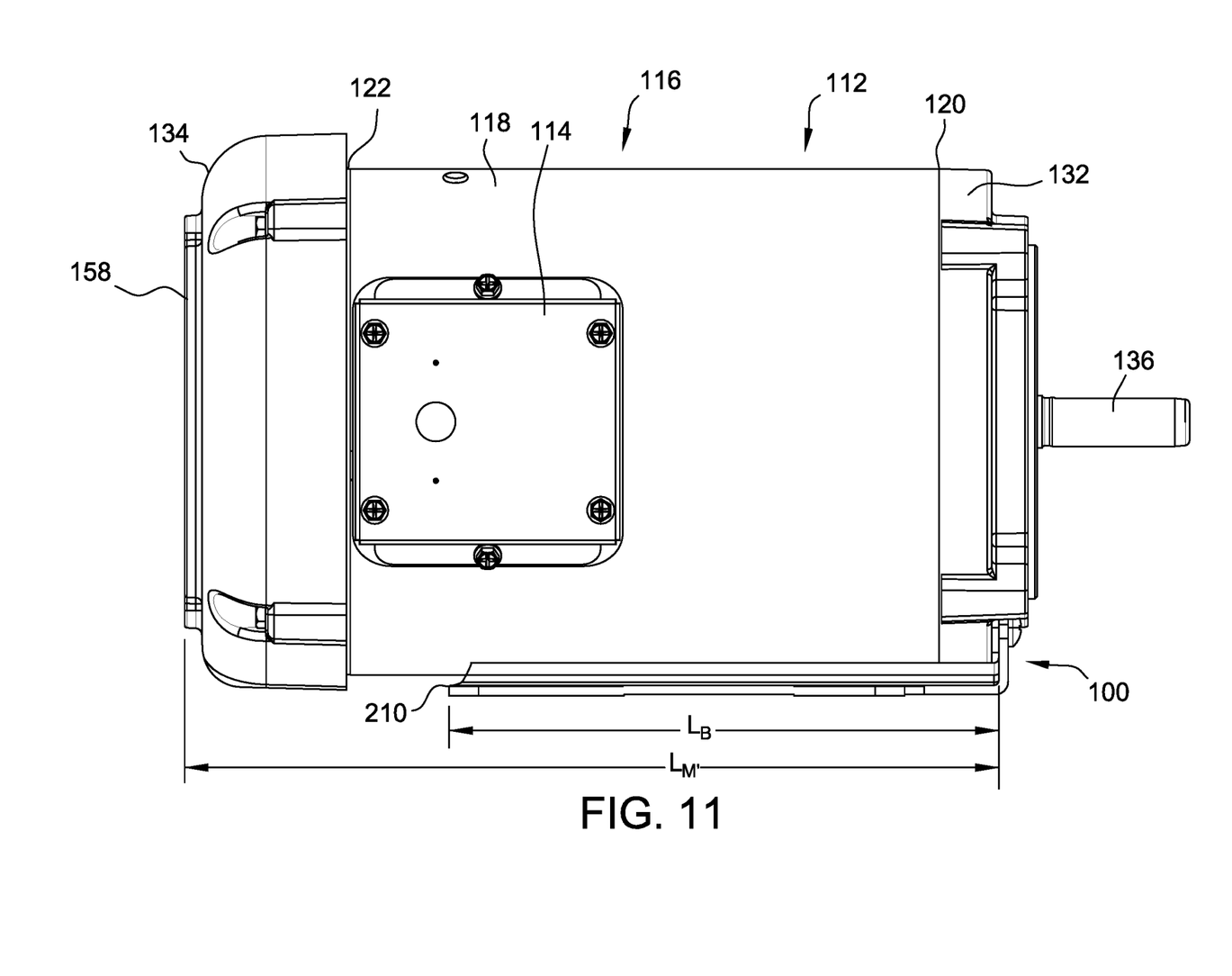
FIG. 11 is a side view of the mount assembly supporting another exemplary embodiment of an electric machine assembly.

In reference to FIGS. 10 and 11, embodiments of the mount assembly 100 described above are a "single-sided" mount assembly 100 such that the first portion 204 is connectable to the shell 118 and the second portion 206 is connectable to only one of the front endbell 132 or rear endbell 134. In other words, at least one of the front endbell 132 or the rear endbell 134 is not connected to the mount assembly 100 nor does the mount assembly 100 obstruct one side of the electric machine assembly 110. Accordingly, a first length of the electric machine assembly $L_M$ may be longer than the length $L_B$. The length $L_M$ of the electric machine assembly 110 extends between the front surface 144 of the front endbell 132 to a rear surface 158 of the rear endbell 134.

Accordingly, the mount assembly 100 is able to accommodate electric machine assemblies 110 of various lengths and sizes. FIG. 10 shows a side view of the mount assembly 100 supporting an alternative embodiment electric machine assembly 110 having a length $L_{m'}$. The length $L_{m'}$ is greater than the length $L_m$. The alternative embodiment of electric machine assembly 110 shown in FIG. 10 includes a shell 118 having a length $L_{m'}$ greater than the length of the first portion 204 of the mount assembly 100.

Embodiments of the present disclosure have advantages over known conventional mounting assemblies for supporting electric motor assemblies. Embodiments of the mount assembly described herein including one or more elastic components, dampen vibration and shock created by the electric machine assembly in both a radial R and axial direction A. Embodiments of the mount assembly described herein may be connected to the electric motor assembly in one of a plurality of orientations. The plurality of available orientations allows a user to select the radial position of the terminal box. Furthermore, embodiments of the mount assembly may support a variety of types and sizes of electric motor assemblies. Embodiments of the mount assembly including the base only connected to one of the first endbell or the second endbell is enabled to support electric motor assemblies with various lengths.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mount assembly for supporting an electric machine assembly, the electric machine assembly comprising a housing comprising a shell extending from a front end to a rear end, an endbell having a front surface, the endbell coupled to the front end of the shell, the mount assembly comprising:
   a base comprising:
      a first portion including a first end, a second end, and a first surface extending between the first end and the second end, the first portion is shaped to receive at least a portion of the housing, wherein when the base supports the electric machine assembly the first portion extends along a length of the shell;
      a second portion disposed at the first end of the first portion and extending therefrom, wherein when the base supports the electric machine assembly the second portion extends along the front surface of the endbell; and
   at least one elastic component configured to be disposed between the base and the electric machine assembly, wherein when the at least one elastic component is engaged with the base and the electric machine assembly, the at least one elastic component is configured to dampen vibrations generated by the electric machine assembly, and wherein when the electric machine assembly is supported by the base the electric machine assembly is selectively arranged in at least one of a first orientation, a second orientation, and a third orientation.

2. The mount assembly of claim 1, wherein the at least one elastic component comprises:
   a first elastic washer configured to be disposed between the first portion and the shell, wherein when the first elastic washer is engaged with the first portion and the shell the first elastic washer dampens vibrations in a radial direction; and
   a second elastic washer configured to be disposed between the second portion and the endbell, wherein when the second elastic washer is engaged with the second portion and the endbell, the second elastic washer dampens vibrations in an axial direction.

3. The mount assembly of claim 1, wherein the base includes a flange extending from at least one of a first side and a second side of the first portion, wherein the flange includes one or more openings for selectively coupling the base to a first surface.

4. The mount assembly of claim 1, wherein the second portion comprises at least one opening sized and shaped to allow a screw to pass through the opening to be threadably engaged with the endbell, wherein the screw couples the second portion to the endbell.

5. The mount assembly of claim 1, wherein the first portion includes at least one opening sized to receive a screw through the opening to be threadably engaged with the housing, the screw couples the first portion to the housing.

6. The mount assembly of claim 1, wherein the endbell includes a recess, wherein the second portion is configured to be received within the recess.

7. The mount assembly of claim 1, wherein the at least one elastic component includes an opening sized to receive a portion of a screw therein, a first annular surface, and an opposing second annular surface, wherein the first annular surface is configured to engage with the base and the second annular surface is configured to engage with the electric machine assembly.

8. The mount assembly of claim 1, wherein the at least one elastic component comprises a stem sized and shaped to be disposed within at least one opening defined on the base.

9. An assembly comprising:
   an electric machine assembly comprising:
      a housing comprising:
         a shell extending between a front end and a rear end;
         an endbell coupled to the front end of the shell, the endbell comprising a front surface; and a terminal box coupled to the shell; and a mount assembly for supporting the electric machine assembly, the mount assembly comprising:

a base comprising:

a first portion including a first end, a second end, and a first surface extending between the first end and the second end, the first portion is shaped to receive at least a portion of the shell, wherein when the base supports the electric machine assembly the first portion extends along a length of the shell;

a second portion disposed at the first end of the first portion and extending therefrom, wherein when the base supports the electric machine assembly the second portion extends along the front surface of the endbell; and at least one elastic component configured to be disposed between the base and the electric machine assembly, wherein when the at least one elastic component is engaged with the base and the electric machine assembly, the at least one elastic component is configured to dampen vibrations generated by the electric machine assembly, wherein when the electric machine assembly is supported by the mount assembly, the electric machine assembly is selectively positionable relative to the base in at least one of a first orientation wherein the terminal box is arranged in a 9 o'clock position, a second orientation wherein the terminal box is arranged in a 12 o'clock position, and a third orientation wherein the terminal box is arranged in a 3 o'clock position.

10. The assembly of claim 9, wherein the at least one elastic component comprises:

a first elastic washer configured to be disposed between the first portion and the shell, wherein when the first elastic washer is engaged with the first portion and the shell the first elastic washer dampens vibrations in a radial direction; and a second elastic washer configured to be disposed between the second portion and the endbell, wherein when the second elastic washer is engaged with the second portion and the endbell, the second elastic washer dampens vibrations of in an axial direction.

11. The assembly of claim 9, wherein the base includes a flange extending from at least one of a first side and a second side of the first portion, wherein the flange includes one or more openings for selectively coupling the base to a first surface.

12. The assembly of claim 9, wherein the electric machine assembly further comprises: a driveshaft rotationally coupled to the endbell and extending though an aperture on the front surface of the endbell, wherein the second portion does not encircle the driveshaft.

13. The assembly of claim 9, wherein the front surface further comprises one or more recessed arched channels that are sized and shaped to receive at least a portion of the second portion.

14. The assembly of claim 9, wherein when the base supports the electric machine assembly, the base does not extend beyond the rear end of the electric machine assembly.

15. The assembly of claim 9, wherein the at least one elastic component comprises a stem sized and shaped to be disposed within at least one opening defined on the base.

16. A method of mounting an electric machine assembly, the method comprising:

positioning an electric machine assembly relative to a base, wherein the electric machine assembly in selectively positioned in a first orientation, in the first orientation the electric machine assembly is in at least one of a first position, a second position, and/or third position relative to the base; and secure the electric machine assembly to the base in the first orientation.

17. The method of mounting of claim 16, the method further comprising disconnecting the electric machine assembly from the base;

repositioning the electric machine assembly from the first orientation to a second orientation, wherein when the electric machine assembly is in the second orientation, the electric machine assembly is a different least one of the first position, the second position and/or the third position compared with the first orientation; and securing the electric machine assembly to the base in the second orientation.

18. The method of mounting of claim 16, wherein the electric machine assembly further comprises a terminal box extending from a housing, when viewing the electric machine assembly from a front, in the first position the terminal box is in a 9 o'clock position, when in the second position the terminal box is in a 12 o'clock position, and in the third orientation the terminal box is in a 3 o'clock position.

19. The method of mounting of claim 16, wherein securing the electric machine assembly to the base comprises:

disposing an elastic washer between the electric machine assembly and the base; and passing a screw through an opening on the base and threadably engaging the screw within an opening on a housing of the electric machine assembly.

\* \* \* \* \*